Oct. 26, 1926.

M. F. FISH

CULTIVATOR

Filed June 21, 1926

WITNESSES
Charles H. Ourand
E. N. Lovewell

Martin F. Fish
INVENTOR

BY E. G. Siggers
ATTORNEY

Oct. 26, 1926.
M. F. FISH
1,604,746
CULTIVATOR
Filed June 21, 1926
2 Sheets-Sheet 2
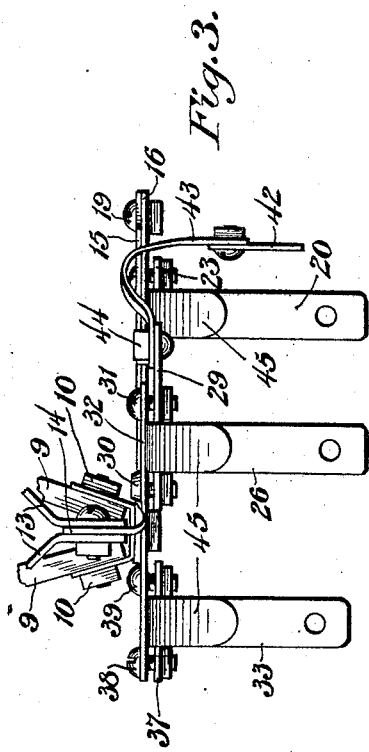
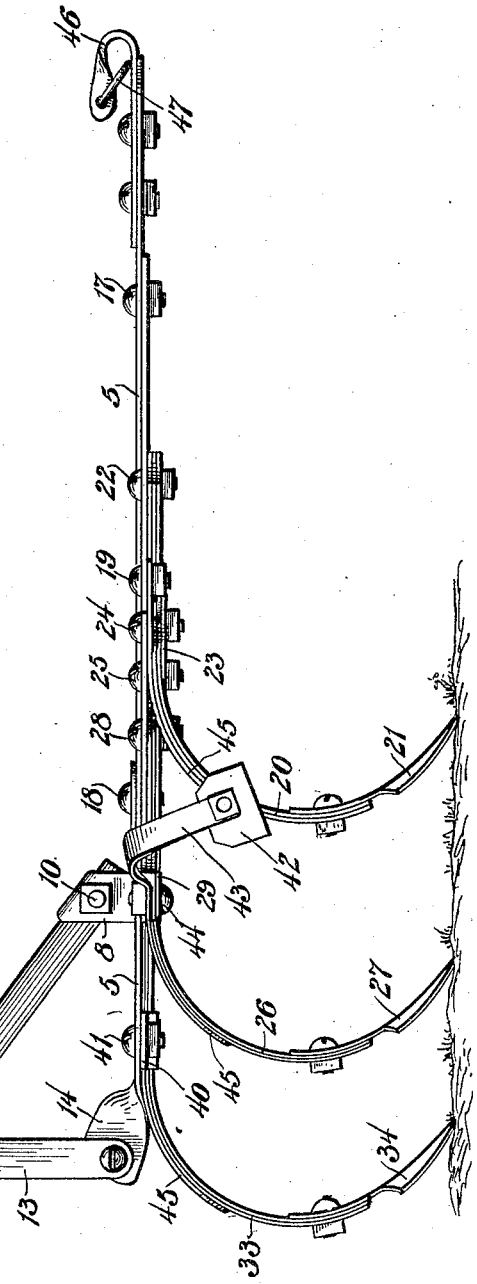

Patented Oct. 26, 1926.

1,604,746

UNITED STATES PATENT OFFICE.

MARTIN F. FISH, OF KIRBYVILLE, TEXAS, ASSIGNOR OF ONE-HALF TO SILAS B. CONN, OF KIRBYVILLE, TEXAS.

CULTIVATOR.

Application filed June 21, 1926. Serial No. 117,453.

This invention relates to an improved cultivator adapted to be drawn by one or two draft animals for stirring up and pulverizing the soil between rows of growing crops, or for preparing the soil for seeding.

The general object of the invention is to provide an implement of this character, which is of general utility, and adapted to a variety of uses, under varying conditions, as to the character of the soil and of the crops.

A more specific object of the invention is to provide a novel construction, which is of light weight and very rugged, so that the cultivator may be used either for heavy or light work, according to whether the soil is firm or hard, or of a character which may be more easily worked. The frame is particularly designed, so that all parts thereof are of simple construction and may be easily assembled, and may also be taken apart and shipped in knockdown condition.

The invention will be more specifically described in connection with the accompanying drawings, which illustrate the preferred form of the invention.

In the drawings:

Figure 2 is a side elevation thereof.

Figure 3 is a rear elevation thereof with parts omitted.

Figure 1:
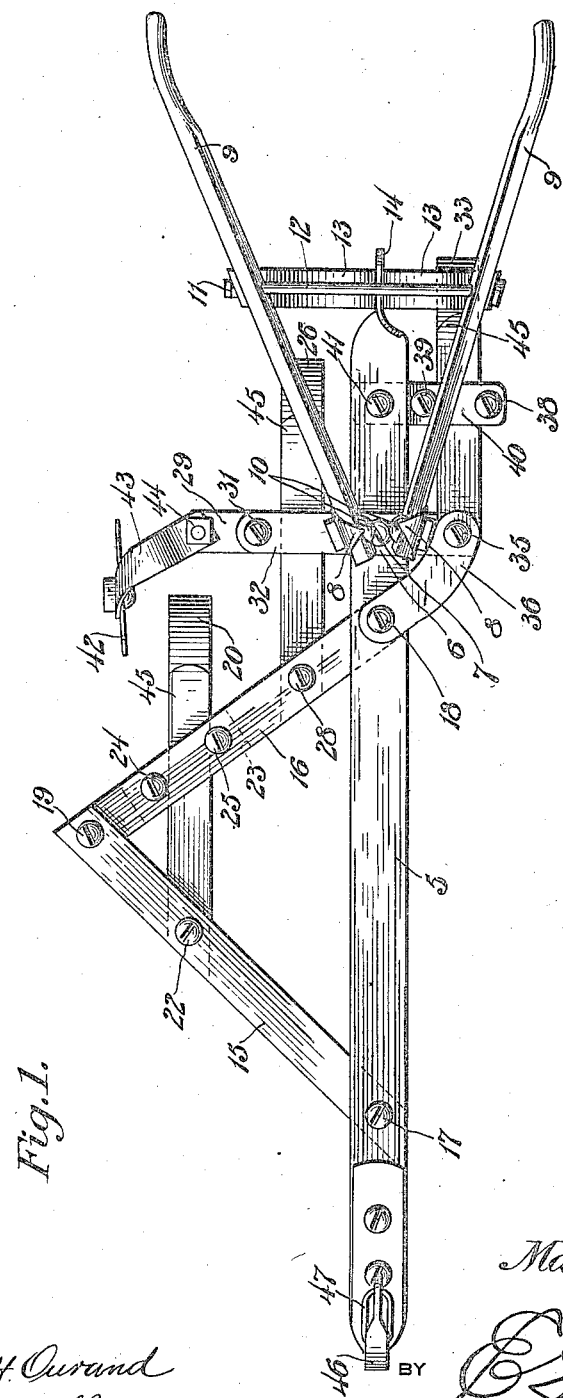
Figure 1 is a plan view of the invention.

The invention, in the form shown in the drawings, includes a main longitudinal beam 5, formed by a flat steel bar, to the rear portion of which a transverse clip 6 is secured by a bolt 7. The ends of the clip 6 are bent upwardly and inwardly, as shown at 8, to receive the lower ends of handle bars 9, which are secured thereto by bolts 10. The intermediate portions of the handle bars 9 are secured to each other by a transverse rod 11, which is surrounded by a spacing sleeve 12 between the handle bars. The ends of the rod 11, and the handle bars through which it passes, are supported by suitable brace bars 13 from the rear end 14 of the bar 5, said rear end being twisted so as to be in a vertical plane.

In front of the handle bars 9, a pair of laterally extending converging bars 15 and 16 are connected to the beam 5 at suitably spaced points by bolts 17 and 18, and are connected at their outer ends to each other by a bolt 19, whereby the bars brace each other, and form a rigid V-shaped structure for supporting the shank or foot 20, which carries the front plow or cultivator tooth 21. The shank or foot 20 is connected to the bar 15 by a bolt 22, and extends rearwardly beneath the bar 16, to which it is secured by means of a strap 23 attached to the bar 16 by bolts 24 and 25 between which the shank 20 passes, and which hold said shank against lateral movement.

The shank or foot 26, which carries the second plow or cultivator tooth 27, is bolted at its forward end, as at 28, to the bar 16, and passes rearwardly over a transverse strip 29 between the bolts 30 and 31, which secure the strip 29 to a transverse supporting bar 32, secured to the beam 5.

The shank or foot 33 of the third or rear plow or cultivator tooth 34 is secured at its forward end by a bolt 35 to the projecting end of the transverse bar 32, and the bolt 35 also serves to secure the end of said bar to the rear end of a brace 36, the forward end of which is secured by the bolt 18 to the beam 5. The shank or foot 33 extends rearwardly from the bolt 35, above a strap 37 and between bolts 38 and 39, which secure the strap to the underside of a bar or brace 40 which extends laterally from the beam 5, and is secured to the latter by a bolt 41.

It is to be understood that in using the cultivator under different conditions and for different crops, different forms of plows or cultivator teeth may be used, either with or without wings. In using the cultivator adjacent a plant row, it is usually desirable to employ a fender above the plow or tooth nearest the row in order to protect the plants. Such a fender is shown at 42, and is secured to the end of a curved shank 43, which is secured by a bolt 44 to the end of the strip 29. The shank 43 may be adjusted laterally at any angle, and it is preferably made from pliable metal, so that it may be bent to the exact shape desired.

The shanks 20, 26 and 33 are made up of a number of strips of spring steel, bolted together so as to obtain sufficient resiliency without sacrificing strength. In light work, where the soil is easily cultivated, only one of these strips need be used for each shank. It is preferred also to use a backing strip 45 on each shank, said backing strip extending for only a portion of the length of the shank, after the manner of a leaf spring.

Connected to the front end of the beam 5 is a hook 46 to which a draft member may be connected. A gravity latch 47, in the form of an elongated ring, is pivoted to the end of the hook for retaining the draft member against accidental detachment.

From the foregoing description, it will be seen that I have provided a cultivator, which is simple and inexpensive in its construction and easily assembled, and which may be used by small farmers, under all conditions, in breaking up land, or in stirring or in pulverizing the soil, either preparatory to the planting, or for cultivating the growing crops. Different forms of plows or cultivator teeth may be attached to the shanks 20, 26 and 33, and the use of the fender 42 is optional. It is to be understood moreover that the specific structure shown and described herein is merely illustrative, and that various modifications may be made in the size, shape and general arrangement of the various elements without departing materially from the salient features of the invention as set forth in the claims.

What is claimed is:

1. In a cultivator, the combination of a beam, a pair of laterally extending converging bars connected to the beam at spaced points and connected to each other at their outer ends so as to form a rigid V-shaped structure, a shank or foot rigidly connected to said bars, a cultivator tooth carried by the shank or foot, a transverse bar connected to the beam in rear of the said converging bars and shorter than the same, a second shank or foot rigidly connected to one of the converging bars and to the said transverse bar, a cultivator tooth provided on the second shank or foot, and a shank secured to the outer end of the transverse bar and extending outwardly and forwardly beyond the first-mentioned tooth and carrying a fender.

2. In a cultivator, a beam, in combination with a pair of laterally extending converging bars rigidly connected to the beam and connected at their outer ends by a bolt so as to form a rigid V-shaped structure, a shank or foot rigidly connected to one of the bars and extending rearwardly beneath the other bar, a strap disposed beneath said other bar and engaging said shank, bolts for connecting the strap to said other bar, whereby the shank or foot is held from lateral movement, and a cultivator tooth carried by the shank or foot.

In testimony, that I claim the foregoing as my own, I have hereto affixed my signature.

MARTIN F. FISH.